United States Patent

[11] 3,557,335

| | | | |
|---|---|---|---|
| [72] | Inventor | Adalbert Sablotny | |
| | | Hagen-Vorhalle, Germany | |
| [21] | Appl. No. | 769,579 | |
| [22] | Filed | Oct. 22, 1968 | |
| [45] | Patented | Jan. 19, 1971 | |
| [73] | Assignee | Hoesch Aktiengesellschaft | |
| | | Dortmund, Germany | |
| [32] | Priority | Oct. 27, 1967 | |
| [33] | | Germany | |
| [31] | | No. 1,652,938 | |

[54] METHOD AND APPARATUS FOR PRODUCING AND/OR TESTING SPIRAL SEAMED TUBES
4 Claims, 9 Drawing Figs.

[52] U.S. Cl..................................................... 219/62,
29/477.3, 318/18, 324/34
[51] Int. Cl....................................................... B23k 11/02
[50] Field of Search........................................... 219/62, 59,
60, 124—6, 124(5) PL; 324/34, 40; 250/219RG,
219S; 29/407, 477.3; 228/8; 318/20.150, .155,
.160

[56] References Cited
UNITED STATES PATENTS

| | | | | |
|---|---|---|---|---|
| 2,590,091 | 3/1952 | Devol........................... | | 318/18 |
| 2,819,379 | 1/1958 | Wiley et al.................... | | 219/62 |
| 3,030,488 | 4/1962 | Kueckens..................... | | 219/62 |
| 3,104,309 | 9/1963 | Wennemann................. | | 219/62 |
| 3,146,331 | 8/1964 | Schubert...................... | | 219/62 |
| 3,341,771 | 9/1967 | Crouch et al................. | | 324/38X |

*Primary Examiner*—A. Bartis
*Assistant Examiner*—L. A. Schutzman
*Attorneys*—Curt M. Avery, Arthur E. Wilfong, Herbert L. Lerner and Daniel J. Tick

ABSTRACT: Method of producing or testing with a welding or testing instrument welded spiral-seamed tubes formed of a steel band, which comprises rolling a steel band in a continuous spiral so as to form a rotating tube-shaped body; placing on the steel band at a constant spacing from an edge of the steel band extending toward a given welding location thereon, a premagnetized tape containing a ferromagnetic material adhering to the steel band and carrying a marking line disposed parallel to the edge of the steel band; sensing the marking line and regulating in accordance therewith the orientation of at least one of the welding and testing instruments with respect to the edge of the steel band so that the instrument and the given welding location are momentarily in registry as the tube-shaped body rotates; and withdrawing the premagnetized tape from the steel band after the steel band edge of the tube-shaped body has rotated past a second one of the instruments in the travel direction of the steel band edge; and apparatus for carrying out the method.

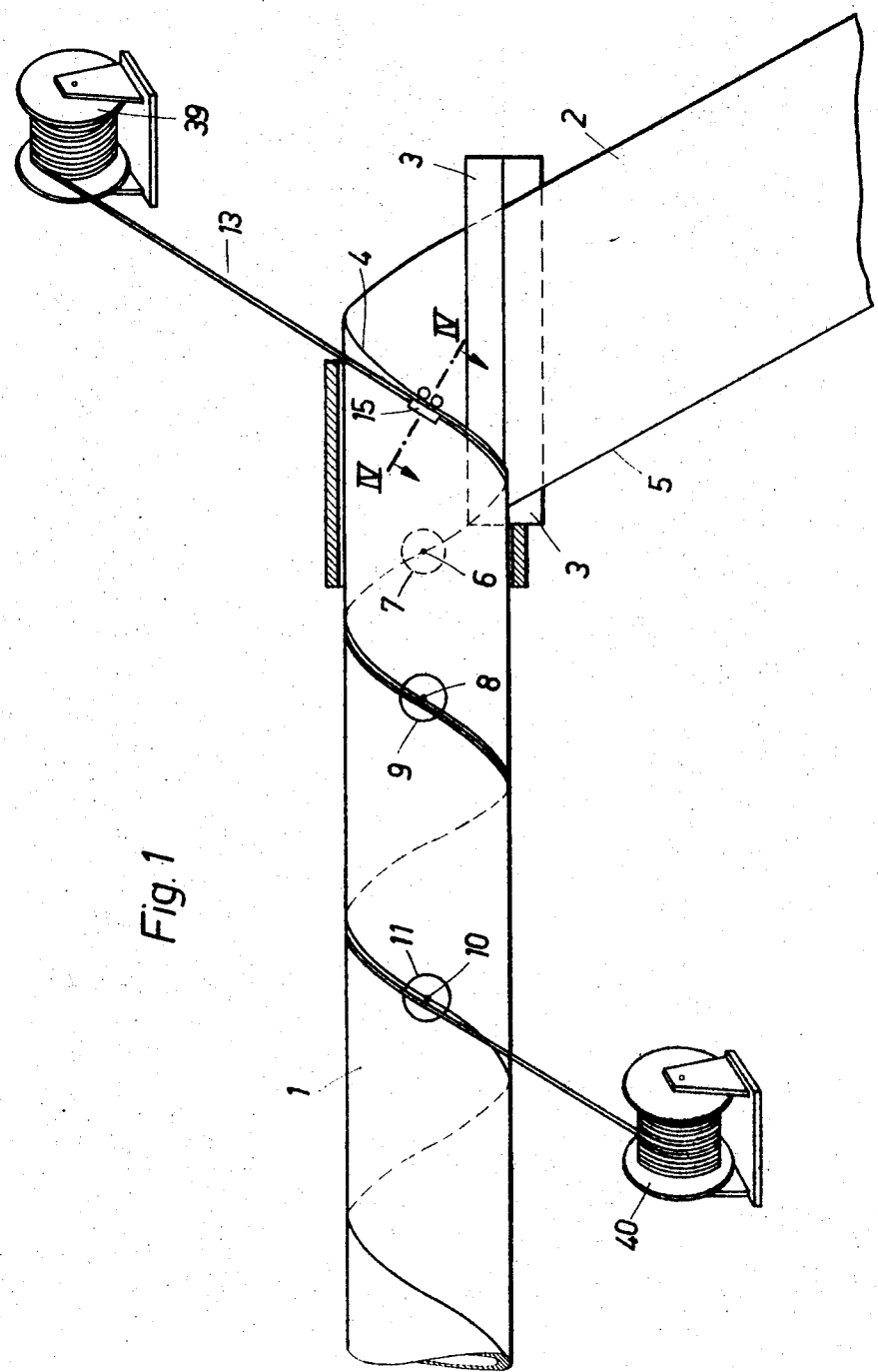

METHOD AND APPARATUS FOR PRODUCING AND/OR TESTING SPIRAL SEAMED TUBES

My invention relates to method and apparatus for producing and/or testing spiral-seamed tubes.

When spiral-seamed tubes are welded, two weld seams or spots are frequently placed one after the other, for example, a first welding seam is located near the spot at which the edges of the steel band first join one another, and a second seam or spot is placed at a distance half of the pitch from the first welding location.

While it is possible to regulate the welding head lying in the first welding seam with the aid of suitable regulating devices so that it matches variations in the position of the band edge and the width of the welding gap, difficulties arise in controlling the second welding head because the pitch of the applied welding seam, as is known from experience, is no not constant and, moreover, due to unavoidable saber shape of the band and due to the variations in the slope or pitch of the seam, no constancy exists. Quite similar difficulties arise if a welding seam applied by means of one or more welding heads is to be tested as to quality on the welding machine by means of an ultrasonic testing head because such a head similarly operates without trouble only when it is located adjacent the welding seam on the base material. The perpendicular spacing of the ultrasonic testing head with respect to the middle of the welding seam must be constant within very narrow tolerances.

In order to meet these difficulties, in accordance with German published application No. 1,214,344, marking line disposed parallel to an edge of the band has been applied to the band before welding; it has been optically sensed and by a subsequent regulation in accordance therewith at least one welding head and/or at least one testing head has been oriented with respect to the band edge. The method of my invention makes use of this feature of the aforementioned German published application to produce the marking line.

To produce the marking line, the aforementioned German published application provides a simple device in the form of a paint receptacle with a stirring mechanism and outlet opening, which is secured to a supporting head, that is pressed by a spring-biasing force against the steel band edge extending toward one of the welding locations and therewith produces a continuous line directly on the steel band spaced at a constant distance from the steel band edge. This method is disadvantageous in that maintenance of the color marking is relatively high and the marking line must later be removed from the completed tube.

It is accordingly an object of my invention to provide method and apparatus for producing and/or testing spiral-seamed tube which avoids the foregoing disadvantages of the heretofore known methods and apparatus of this general type, and more particularly which reduces maintenance of the marking and minimizes the time for removing the marking line from the finished tube.

With the foregoing and other objects in view, I accordingly provide method for producing and/or testing spiral-seamed tubes formed of a steel band, which comprises rolling a steel band in a continuous spiral so as to form a rotating tube-shaped body; placing on the steel band at a constant spacing from an edge of the steel band extending toward a given welding location thereon, a premagnetized tape containing a ferromagnetic material adhering to the steel band and carrying a marking line disposed parallel to the edge of the steel band; sensing the marking line and regulating in accordance therewith the orientation of at least one of the welding and testing instruments with respect to the edge of the steel band so that the instrument and the given welding location are momentarily in registry as the tube-shaped body rotates; and withdrawing the premagnetized tape from the steel band after the steel band edge of the tube-shaped body has rotated past a second one of the instruments in the travel direction of the steel band edge; and apparatus for carrying out the method.

Such a magnetized tape is capable of being applied to the steel band by relatively simple means very accurately in constant spacing from the steel band edge and provides therewith a marking line free of all deviations and inaccuracies, which is suitably sensed so as to regulate without any trouble a welding head and/or an ultrasonic testing head. The magnetized tape, which is many times longer than the arc length of the welding seam of a single tube, can be used repeatedly.

In accordance with a further feature of the invention, the marking line can be produced by providing the magnetized tape with a layer covering a part of the surface thereof and which has a different reflection capability than that of the magnetized tape. Also in accordance with the invention, a layer can be applied to the magnetized tape so as to fully cover the tape, the layer having on the outside thereof a light and a dark region separated by the marking line. Naturally, the magnetized tape may also carry any other marking line, for example a magnetic track detectable by a magnetic measuring device.

The apparatus for carrying out the method of my invention includes a guiding head for the incoming magnetized tape, and spring means for forcing the guiding head against one of the steel band edges and for pressing the guiding head against the steel bank surface.

Other features which are considered as characteristic for the invention are set forth in the appended claims.

Although the invention is illustrated and described herein as embodied in method and apparatus for producing and/or testing spiral-seamed tubes, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIG. 1 is a diagrammatic view partly in perspective of apparatus for carrying out the method of producing and/or testing spiral-seamed tubes according to my invention;

Figure 5:
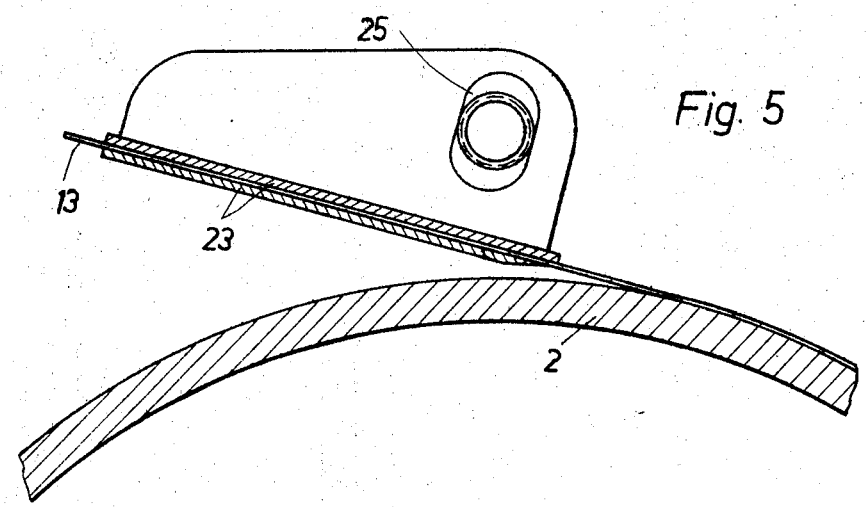
FIG. 5 is a sectional view taken along the line V–V in FIG. 4.
Figure 3:
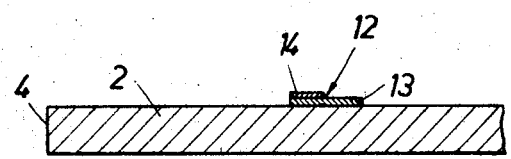
FIG. 3 is a cross-sectional view taken along the line III–III in FIG. 2.
Figure 2:
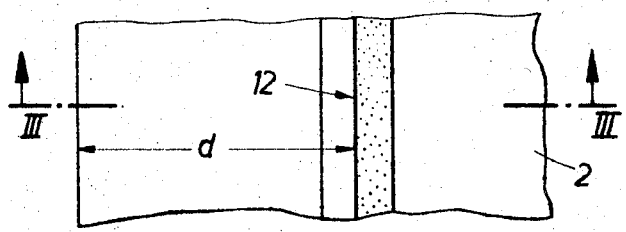
FIG. 2 is a plan view of a portion of the steel band shown in FIG. 1 with a portion of magnetized tape adhering thereto.

Referring now to the drawings and first, particularly, to FIG. 1 thereof, there is shown a spiral-seamed tube 1 being formed from a steel band 2 on a tube-winding machine represented only by a pair of rollers 3 in the FIG. Both steel band edges 4 and 5 are welded together at a spot 6, where they meet for the first time, by arc welding with a first welding head 7 represented as a circle. This welding head 7, as shown in the embodiment of FIG. 1, is located within the tube 1. After the tube has rotated through an angle of 180°a second welding is effected at the spot 8 by means of a second welding head 9 located outside the tube 1. The weld material of the thus applied double weld seam is inspected at the spot 10 by means of an ultrasonic testinghead 11 after the tube 1 is rotated further through an angle of 360°.

Figure 9:
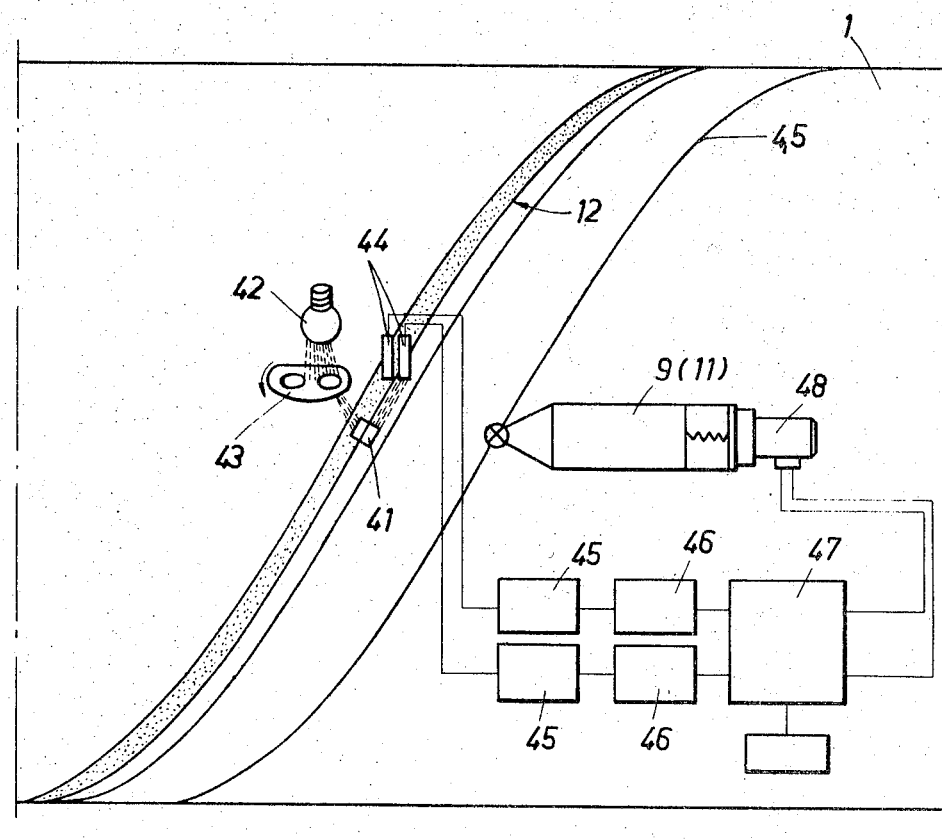
FIG. 9 is a schematic view of a suitable optical detecting device together with subsequent regulating system.

For the foregoing reasons, the second welding head 9 and the ultrasonic testinghead 11, as shown in FIG. 9, are axially displaceable so as to be capable of being adjusted on the previously applied welding seam without any difficulty. The location of the welding head 9 and the testing head 11 is regulated photoelectrically, for example, by means of a marking line 12 extending adjacent to the weld seam, as is described more fully hereinbelow.

The marking line 12 is located on a magnetic tape 13, which is secured to the steel band 2 by magnetic adhesion. By a magnetic or magnetized tape there is meant herein a flexible tape or band of suitable synthetic material such as cellulose acetate or a polyester known under the trade name Mylar to which a ferromagnetic substance such as iron oxide has been added so that it can be permanently magnetized. The magnetization is effected in such a way that the tape at least at one of its outer surfaces has the capability of attracting steel objects or conversely of adhering magnetically to a steel object. Such magnetic tapes are well known to the man of ordinary skill in the art as well as to laymen, and are used for many purposes such as, for example, for the magnetic attachment of labels. For the purpose of my invention, a magnetic tape having a width of about 20 mm. is adequate.

The magnetic tape 13 is applied in the hereinafter described manner to the steel band 2 so that the spacing thereof from one edge 4 of the steel band is constant. The magnetic tape 13 proper is dark in color due to its own nature. In order to obtain a contrast and an optical marking line 12 therewith, the magnetic tape 13 can be provided, from the beginning thereof, with a light-colored coating 14, for example in the form of a strip of plastic material, so that the desired marking line 12 is produced. Instead of applying a strip, half of the magnetic band 13 in the longitudinal direction thereof can be given a light color. The marking line has a constant spacing $d$ from the steel band edge 4. A workable value for the spacing $d$ is about 150 mm.

A guiding head generally identified by the reference numeral 15 in FIG. 1, serves for applying the magnetic tape 13 to the steel band 2. Two embodiments of this guiding head are shown in enlarged view in FIGS. 4 to 8.

Figure 4:
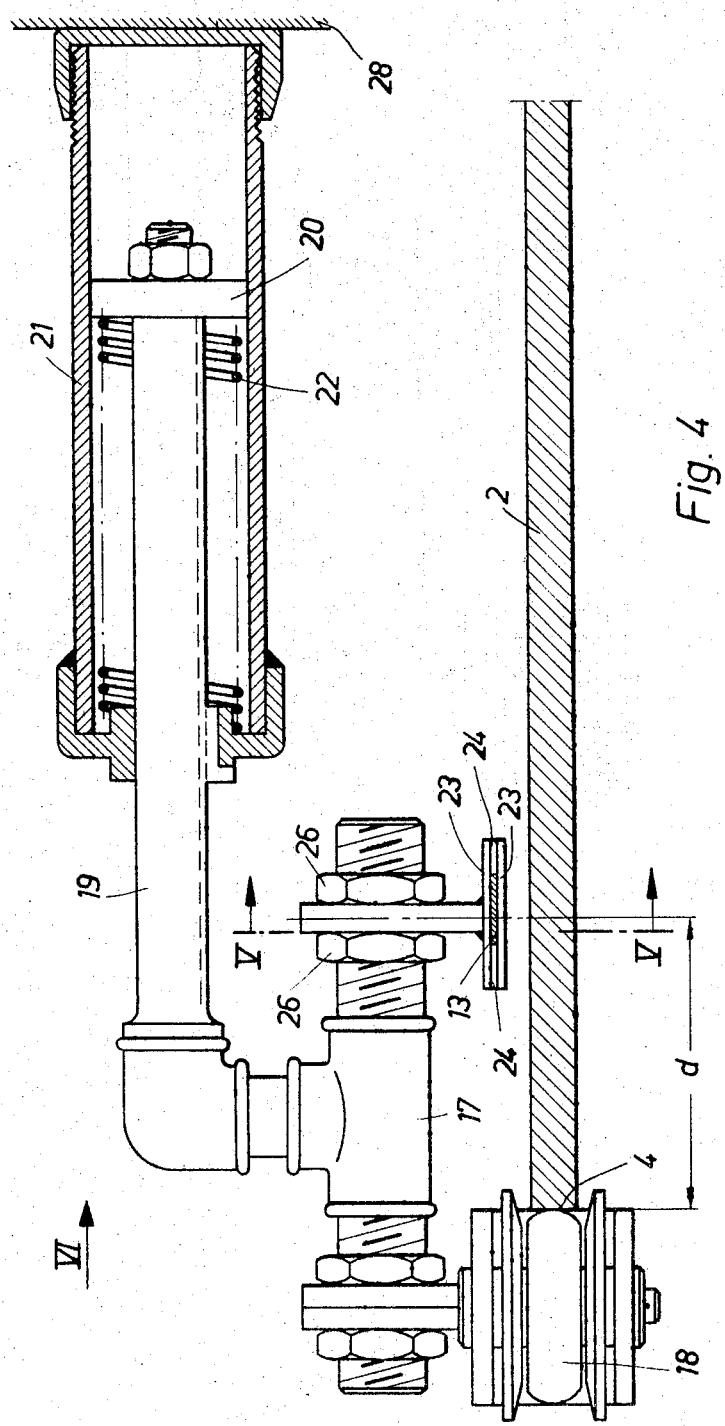
FIG. 4 is a much enlarged sectional view taken along the line IV–IV in FIG. 1 and showing embodiment of the guiding head for the magnetized tape in accordance with the apparatus of my invention.
Figure 6:
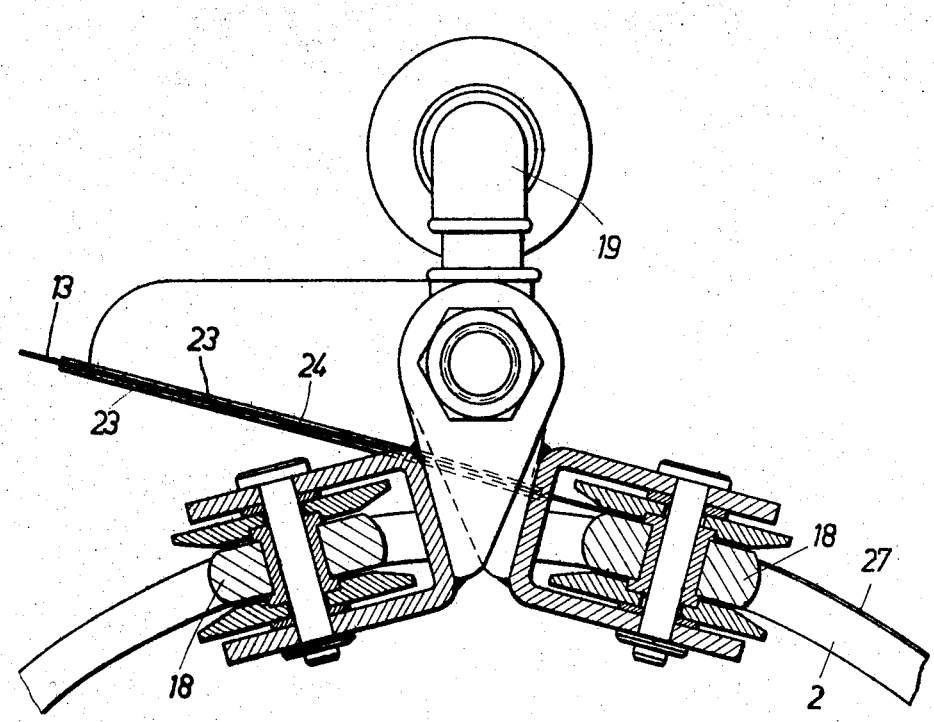
FIG. 6 is a sectional view taken along the line VI–VI in FIG. 4.

In the embodiment of FIGS. 4 to 6 at one end of a tube traverse or T-shaped coupling 17, two rollers 18 are mounted for free rotation and are maintained in abutment with the steel band edge 4. For this purpose, the tube traverse 17 is secured to one end of an arm 19 which carries at the other, free end thereof, a piston 20 that is displaceable in a cylinder 21. The cylinder 21 contains a helical compression spring 22 which tends to displace the arm 19 toward the right-hand side of FIG. 4 and thereby ensures the constant engagement of the rollers 18 with the steel band edge 4. The tube traverse 17 carries at its right-hand end, as shown in FIG. 4, a guide member for the magnetic tape 13, formed of relatively wide plates 23 and relatively narrow strips 24 sandwiched therebetween so as to define a space corresponding to the cross-sectional dimensions of the magnetic tape 13. The guide member 23, 24 can be adjusted radially with respect to the axis of the tube 2 by means of an elongated hole 25 (FIG. 5) and tensioning nuts 26 (FIG. 6). The middle of the guide member 23, 24 which coincides with the marking line 12 is spaced the aforementioned distance $d$ from the steel band edge 4. During the operation, the starting end of the magnetic tape 13 is threaded through the guide member 23, 24 and brought into engagement with the outer surface 27 of the steel band 2 so that it adheres thereto. The moment the tube 1 is placed in rotation the magnetic tape 13 is entrained therewith due to magnetic adhesion and is maintained constantly spaced a distance $d$ from the steel band edge 4 due to the guide member 23, 24. The guiding head for the magnetic tape 13 shown in FIGS. 4 to 6 is secured by means of the cylinder 21 to the frame 28 of the otherwise nonillustrated tube winding machine.

Figure 7:
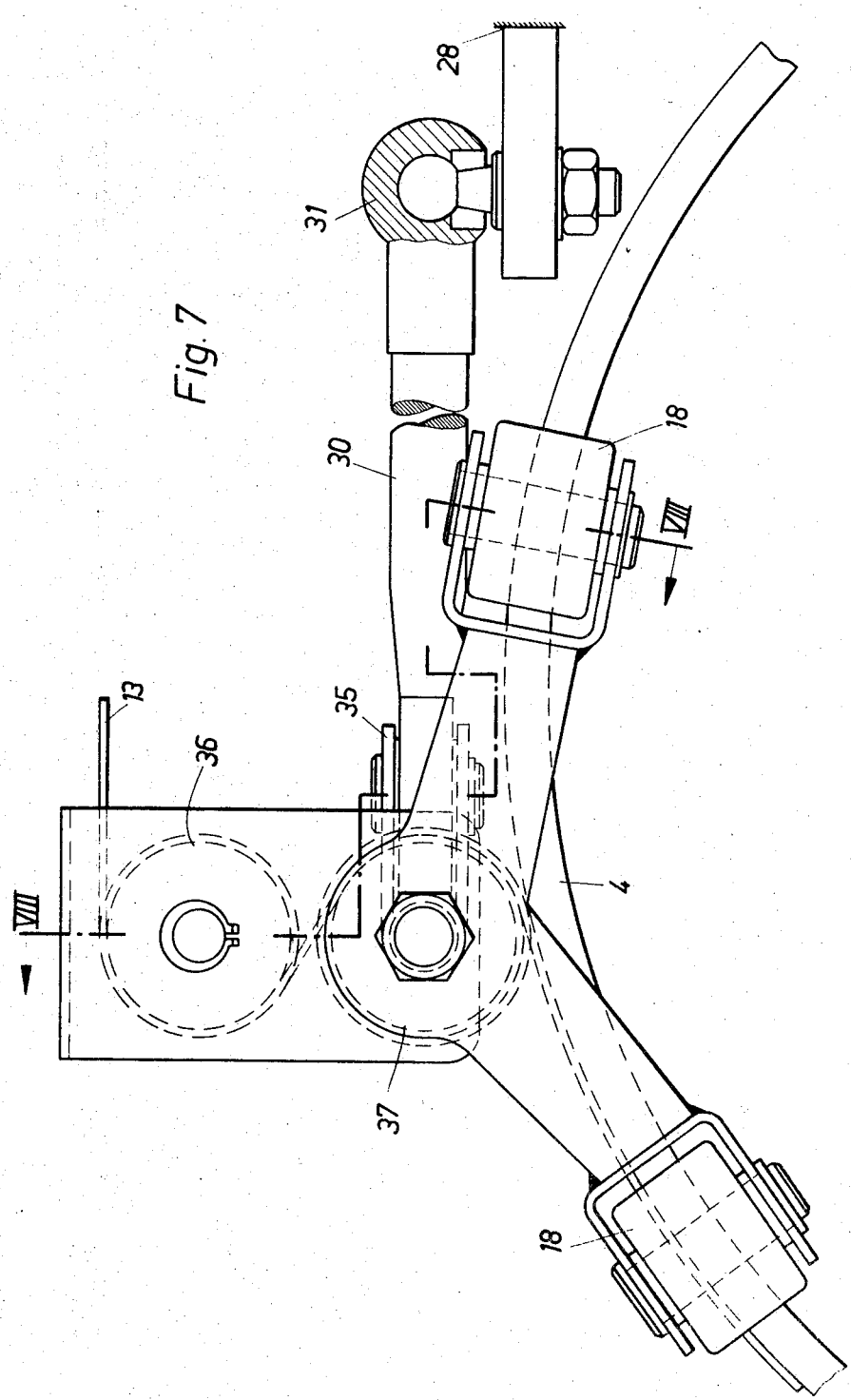
FIG. 7 is a view corresponding to that of FIG. 6 of another embodiment of the guiding head for the magnetized tape according to my invention.
Figure 8:
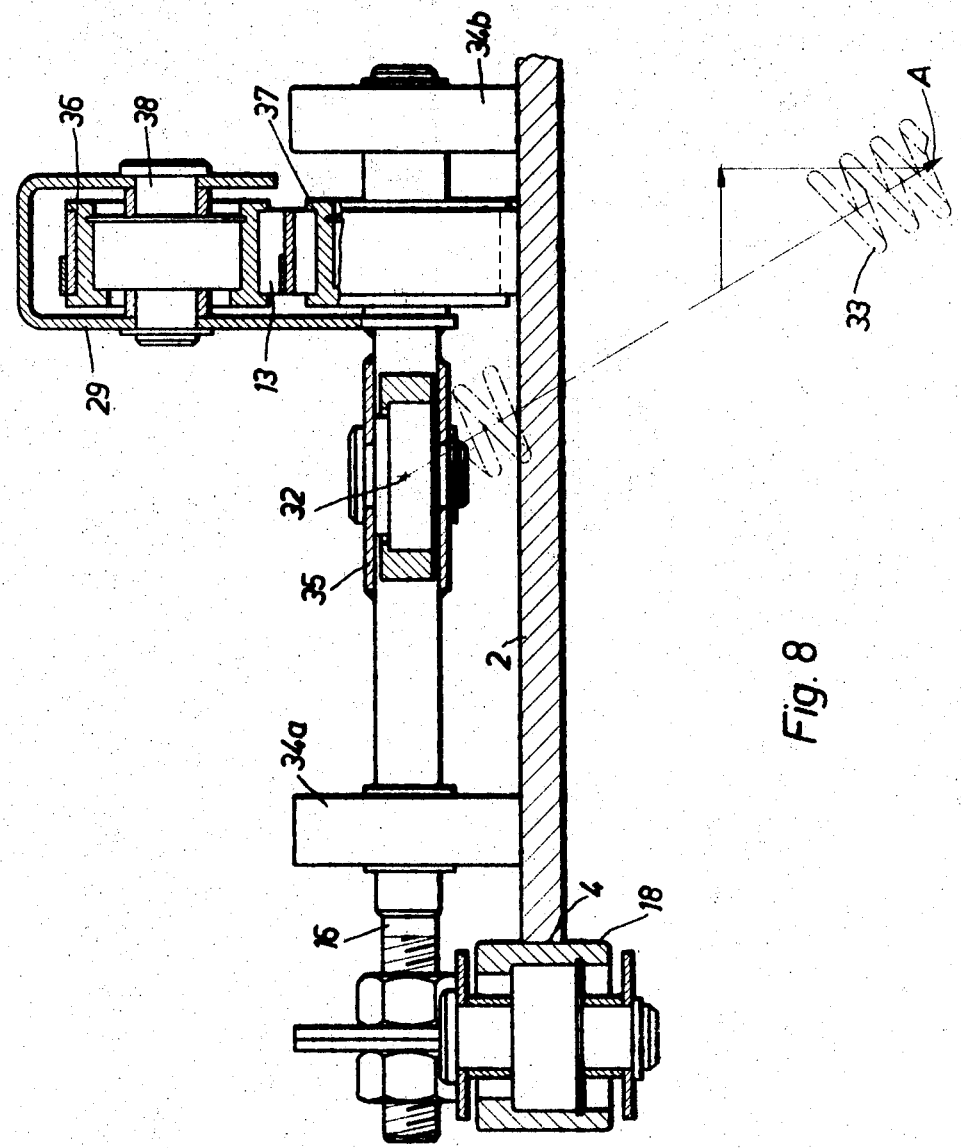
FIG. 8 is a sectional view taken along the line VIII–VIII in FIG. 7.

The structure of the embodiment of the guiding head for the magnetic tape 13 according to FIGS. 7 and 8 differs from that of FIGS. 4 to 6 in that a spring 33 is provided which holds the guiding head in engagement with the steel band edge 4 and presses it against the steel band 2. Two rollers 18 are again provided which abut the steel band edge 4 and are attached to a shaft 16 that is supported by antifriction bearing rollers 34$a$ and 34$b$ on the steel band 2. Moreover, the shaft 16 is secured through an arm 30 with a connector member 35 and through a joint 31 connected to the free end of the arm 30 to the aforementioned frame 28 of the tube-winding machine. The spring 33 exerts a force acting on a point 32 of the connector member 35 for the arm 30. The spring 33 is shown in phantom in FIG. 8 since it actually lies in front of the plane of the figure. The direction in which the spring tension acts is indicated by the arrow A. The spring 33 simultaneously ensures that the engagement between the antifriction bearing rollers 34$a$ and 34$b$, on the one hand, and the steel band 2, on the other hand, and between the rollers 18, on the one hand, and the steel band edge 4 on the other hand, is continuously maintained.

The shaft 16 carries between the connector member 35 and the antifriction bearing roller 34$b$ a holder 29 with a roller 36 freely rotatably mounted on a pin 38. Below the roller 36 there is provided another roller 37 corresponding thereto and rotatably mounted on the shaft 16. These rollers 36 and 37 serve for guiding the magnetic tape 13 which is coiled around the rollers 36 and 37 in the manner shown in FIG. 7.

In operation, the embodiment of FIGS. 7 and 8 does not differ from that of FIGS. 4 to 6.

The magnetic tape 13 is drawn from a first reel 39 in the manner shown in FIG. 1, is coiled around the tube 1 at least up to spot 10, and is then withdrawn from the tube 1 by a second reel 40. The magnetic tape 13 can therefore be reused after the tube 1 has been completed, requiring that the coils of the tape 13 wound on the reels 39 and 40 be merely interchanged.

To detect or sense the marking line 12, a spot 41 on the line 12 is illuminated by a lamp 42, as wh shown in FIG. 9. In order to eliminate the influence or effect of other light sources, pulsating light is employed by disposing a rotating diaphragm 43 between the lamp 42 and the spot 41 to be illuminated. The bus subsequently connected regulating system is so adjusted that it only responds to light broken at a specific frequency by the diaphragm 43. The illuminated spot 41 lies partly to the right-hand side and partly to the left-hand side of the marking line 12. Thereby, two illuminated regions of different brightness are formed by this line 12, as shown in FIG. 9. Both regions are examined by two photoelectric cells 44 which operate through conventional amplifiers 45 and delay lines 46 on a conventional control or regulating mechanism 47, by means of which a geared motor 48 is actuated for axially adjusting either the welding head 9 or the testing head 11 in one or the other direction. Both the lamp 4 with the diaphragm 43 as well as the photocells 44 follow the displacement of the controlled members i.e. the welding head 9 and the testing head 11. If the marking line 12 travels toward one or the other side, the size of both differently bright regions of the light spot 41 vary inversely. The previously matched photocells are thereby differently excited and issue signals which activate the regulating or control mechanism to displace the system so far that the photocells return to their original matched and identical state. In this manner, the welding head 9 and the testing head 11 are always held above the center between both originally existing steel band edges 4 and 5.

I claim:

1. Method of producing spiral-welded seamed tubes formed of a steel band which comprises rolling a steel band in a continuous spiral so as to form a rotating tube-shaped body; placing on the steel band, at a constant spacing from an edge of the steel band and extending toward a given welding location thereon, a premagnetized tape containing a ferromagnetic material adhering to the steel band and carrying a marking line disposed parallel to the edge of the steel band; sensing the marking line and controlling in accordance therewith the orientation of a welding instrument with respect to the edge of the steel band so that the instrument and the given welding location are momentarily in registry as the tube-shaped body rotates, and further controlling in accordance therewith the welding by the welding instrument; and withdrawing the premagnetized tape from the steel band after the steel band edge of the tube-shaped body has rotated past a given location downstream of the welding instrument in the travel direction of the steel band edge.

2. Method according to claim 1 which comprises applying to the premagnetized tape along the length thereof and extending only partially across the width thereof a coating having a reflection capability differing from that of the remaining exposed region of the premagnetized band so as to form the marking line thereon.

3. Method according to claim 1 which comprises magnetizing a magnetic track on the tape along the length thereof to form the marking line.

4. Method according to claim 1 in combination with a method of testing the spiral-welded seam tubes which comprises, after welding the steel band at the welding location thereof, sensing the marking line and controlling in accordance therewith the orientation of a testing instrument with respect to the edge of the steel band at the given location downstream of the welding instrument so that the testing instrument and the given welding location are momentarily in registry as the tube-shaped body rotates, and further controlling in accordance therewith the testing by the testing instrument.